United States Patent [19]
Ito

[11] Patent Number: 5,454,458
[45] Date of Patent: Oct. 3, 1995

[54] MULTI-BENT DRAG STRIP

[75] Inventor: Joji Ito, Shizuoka, Japan

[73] Assignee: NSK-Warner K.K., Tokyo, Japan

[21] Appl. No.: 276,666

[22] Filed: Jul. 18, 1994

[30] Foreign Application Priority Data

Jul. 19, 1993 [JP] Japan ................................ 5-224029

[51] Int. Cl.$^6$ ...................................................... F16D 41/07
[52] U.S. Cl. ........................................ 192/45.1; 192/41 A
[58] Field of Search .................................. 192/41 A, 45.1

[56] References Cited

U.S. PATENT DOCUMENTS

| | | | |
|---|---|---|---|
| 2,912,086 | 11/1959 | Troendly et al. | 192/45.1 |
| 3,545,581 | 12/1970 | Kent | 192/45.1 |
| 4,089,395 | 5/1978 | Fogelberg | 192/41 A |

FOREIGN PATENT DOCUMENTS 1-169130  7/1989  Japan.

*Primary Examiner*—Richard M. Lorence
*Attorney, Agent, or Firm*—Evenson, McKeown, Edwards & Lenahan

[57] ABSTRACT

A multi-bent drag strip is provided for use in a one-way clutch having an outer and inner rings, a ring-shaped outer and inner retainers arranged between inner and outer circumferential surfaces of said outer and inner rings, and plural sprags held in place by said outer and inner retainers to permit selective transmission of a torque between said outer and inner rings. The drag strip has a strip portion to be disposed in contact at a part thereof with said outer circumferential surface of said inner ring and bent end portions located on opposite sides of said strip portion and to be disposed in contact with an inner circumferential surface of said inner retainer. Between an area of contact between said strip portion and said outer circumferential surface of said inner ring and each of said bent end portions, said strip portion has at least one bent portion to be disposed out of contact with said outer circumferential surface of said inner ring and said inner circumferential surface of said inner retainer.

10 Claims, 3 Drawing Sheets 5,454,458

MULTI-BENT DRAG STRIP

BACKGROUND OF THE INVENTION a) Field of the Invention

This invention relates to a drag strip suitable for use in a one-way clutch, and especially to a drag strip having at least two bent portions at such positions that when the drag strip is assembled in the one-way clutch, the two bent portions are kept out of contact with an inner circumferential surface of an inner retainer and an outer circumferential surface of an inner ring.

b) Description of the Related Art

A sprag-synchronized one-way clutch is constructed inter alia of an outer ring having an inner circumferential surface, an inner ring having an outer circumferential surface disposed in a mutually-opposing concentric relationship with the inner circumferential surface, plural sprags arranged in an annular space formed between these inner and outer circumferential surfaces, an outer and inner retainers for holding these sprags at predetermined positions, and a ribbon spring applying a force to keep the sprags contacted with the outer and inner rings.

To ensure transmission of motion of an inner or outer ring as a driver ring to the sprags upon a sudden acceleration or deceleration or high-speed rotation of the driver ring in such a one-way clutch, frictional force applying means such as drag strips are disposed between the driver ring and its adjacent retainer.

These drag strips are attached especially to an inner retainer of a one-way clutch and upon insertion of an inner ring as a driver ring, a central flat strip portion of each drag strip is flexed so that the central flat strip portion is maintained under a predetermined force in contact with the inner ring. A dragging torque is therefore transmitted in the order of the drag strips, the inner retainer and sprags, thereby making it possible to reduce wearing of the sprags and also ensure engagement of the one-way clutch.

One example of conventional drag strips is illustrated in FIG. 8. This conventional drag strip, which is designated generally at numeral 1, is formed of a strip-shaped material having a flat strip portion 2 at a middle portion thereof and clips 7 of a turned square U-shaped cross-sectional shape formed at opposite end portions via bent portions 3, as viewed in the direction of the length of the drag strip 1.

As is depicted in FIG. 9, this drag strip 1 is attached at opposite ends thereof to the inner retainer 4 by the clips 7 and the inner retainer 4 is also supported by intermediate hangers 6. Upon insertion of an inner ring 5 into the inner retainer 4, the strip portion 2 of the drag strip 1 is flexed along the contour of a peripheral edge of the inner ring 5 so that the strip portion 2 outwardly protrudes in the direction of a radius of the inner ring 5. As a consequence, the inner ring 5 and the drag strip 1 are maintained in contact with each other under a predetermined pressure. Numeral 8 indicates a sliding area of an inner circumferential surface of the strip portion 2, at which the strip portion 2 is maintained in sliding contact with an outer circumferential surface of the inner ring 5.

The contact pressure between the inner ring 5 and the drag strip 1 can be set at various values depending on the application of the one-way clutch. Described basically, this contact pressure depends on the amount of a flexion of the drag strip 1 when the inner ring 5 has been inserted. To obtain an amount of flexion large enough to provide a sufficient contact pressure, it has heretofore been the practice to make the strip portion 2 of the drag strip 1 longer.

When the strip portion 2 of the drag strip 1 is made longer, the rigidity of the drag strip 1 is lowered. This leads not only to difficulty in setting a desired dragging force but also to susceptibility to breakage of the drag strip 1 due to an increased bending moment. Furthermore, it is necessary to use a material excellent in mechanical properties such as rigidity and abrasion resistance as a material for the drag strip 1. Therefore the increased length of the strip portion 2 has also resulted in high manufacturing cost.

Further, the conventional drag strip has at each clip portion thereof a single bent portion 3 formed in conformity with the radius of curvature of the inner retainer 4 as shown in FIG. 9. Because of the construction that the single bent portion 3 is formed at each clip portion and each clip 7 is fitted in a corresponding window portion of the inner retainer, the amount of flexion of the drag strip 1 varies depending on a raceway diameter of the inner ring so that an adequate spring force is hardly available. To provide a larger spring force, it may be contemplated to make the position of each clip farther from the area of contact between the drag strip 1 and the inner ring 5. This however result in the drawback that the strip portion becomes longer as described above.

With a view toward overcoming the above-described drawback, another drag strip has been proposed. As shown FIG. 10, this drag strip which is designated at numeral 10 is provided on each side of a strip portion 12 with bent portions 13a,13b which are bent in opposite directions. This improvement has made it possible to increase the rigidity of the drag strip, to reduce the strip thickness of the drag strip and also to reduce the circumferential length of the drag strip, thereby bringing about the advantage that the material cost can be saved. Because of the short length between the bent portions, however, the drag strip 10 is accompanied by the inconvenience that its spring force is too high. This has resulted in an unduly high contact pressure at a sliding area 18, leading to the drawback that premature wearing is unavoidable.

SUMMARY OF THE INVENTION

The present inventor has proceeded with extensive research to overcome the above-described drawbacks of the conventional drag strips. As a result, it has been found that the above drawbacks can be overcome by providing a drag strip with at least one bent portion on each side of an area of contact between the drag strip and an inner ring of a one-way clutch where the drag strip is disposed between the inner ring and an inner retainer or between the drag strip and an outer ring of the one-way clutch where the drag strip is disposed between the outer ring and an outer retainer in such a way that when the drag strip is assembled in the one-way clutch, the bent portion is maintained out of contact with the inner ring and the inner retainer or with the outer ring and the outer retainer. The above finding has led to the completion of the present invention.

In one aspect of the present invention, there is thus provided a multi-bent drag strip suitable for use in a one-way clutch having an outer and inner rings, a ring-shaped outer and inner retainers arranged between inner and outer circumferential surfaces of the outer and inner rings, and plural sprags held in place by the outer and inner retainers to permit selective transmission of a torque between the outer and inner rings. The drag strip has a strip portion to be disposed in contact at a part thereof with one of the inner circumferential surface of the outer ring and the outer circumferential surface of the inner ring and bent end portions located on opposite sides of the strip portion and to be disposed in contact with an outer circumferential surface of the outer retainer when the strip portion is disposed in contact at the part thereof with the inner circumferential surface of the outer ring or with an inner circumferential surface of the inner retainer when the strip portion is disposed in contact at the part thereof with the outer circumferential surface of the inner ring. Between an area of contact between the strip portion and the inner circumferential surface of the outer ring or the outer circumferential surface of the inner ring and each of the bent end portions, the strip portion has at least one bent portion to be disposed out of contact with the inner circumferential surface of the outer ring and the outer circumferential surface of the outer retainer or with the outer circumferential surface of the inner ring and the inner circumferential surface of the inner retainer.

In another aspect of the present invention, there is also provided a multi-bent drag strip suitable for use in a one-way clutch having an outer and inner rings, a ring-shaped outer and inner retainers arranged between inner and outer circumferential surfaces of the outer and inner rings, and plural sprags held in place by the outer and inner retainers to permit selective transmission of a torque between the outer and inner rings. The drag strip having a strip portion to be disposed in contact at a part thereof with the outer circumferential surface of the inner ring and bent end portions located on opposite sides of the strip portion and to be disposed in contact with an inner circumferential surface of the inner retainer. Between an area of contact between the strip portion and the outer circumferential surface of the inner ring and each of the bent end portions, the strip portion has at least one bent portion to be disposed out of contact with the outer circumferential surface of the inner ring and the inner circumferential surface of the inner retainer.

Owing to the constructions described above, each drag strip according to the present invention can provide, without the need for a long drag strip, an adequate racing drag (dragging torque) by the bent portion formed on each side of the area of contact between the drag strip and the inner ring where the drag strip is disposed between the inner ring and the inner retainer or between the drag strip and the outer ring of the one-way clutch where the drag strip is disposed between the outer ring and the outer retainer. Irrespective of the raceway diameter of the inner ring, the drag strip according to the present invention can provide an adequate spring force, that is, a proper racing drag. In addition, by changing the dimensions (position and angle) of each bent portion as needed, a wide variety of drags can be obtained.

The racing drag has heretofore been adjusted by changing the number of drag strips to be assembled in a one-way clutch. According to the present invention, however, a desired racing drag can be obtained without the need for changing the number of drag strips and a wide range of racing drags can be obtained at will. The present invention has therefore provided a improved design tolerance.

DETAILED DESCRIPTION OF THE INVENTION AND PREFERRED EMBODIMENTS

The embodiments of the present invention will hereinafter be described in detail, assuming in each embodiment that the drag strip is disposed between an inner ring and an inner retainer of a one-way clutch. When the drag strip according to each embodiment is disposed between an outer ring and an outer retainer of the one-way clutch, a similar construction can be adopted although clips and hanger(s) have to be formed on an inner surface of the drag strip. Needless to say, either the inner ring or the outer ring of the one-way clutch can be used as a driver ring.

Figure 1:
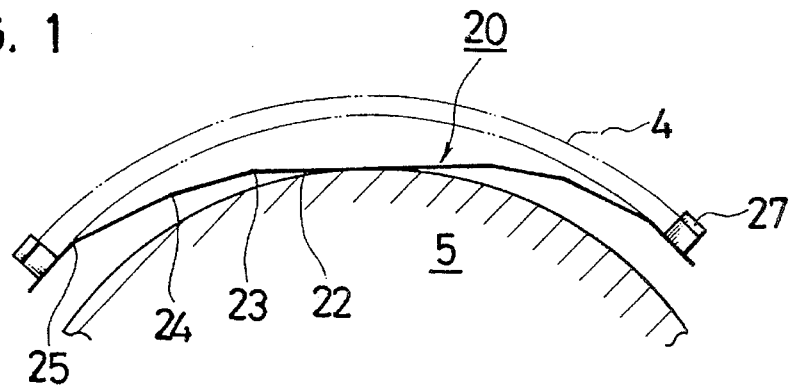
FIG. 1 is a schematic fragmentary side view of an one-way clutch and a drag strip assembled therein, which illustrates the concept of the present invention.

The concept of the present invention is first described with reference to FIG. 1. A strip portion 2 of the drag strip 20 adapted to be disposed for sliding on the outer circumferential surface of the inner ring 5 is bent at three portions 23,24,25 on each side of an area of contact between the drag strip 20 and the inner ring 5. Of these bent portions 23,24,25, the bent portion 25 is maintained in contact with the inner circumferential surface of the inner retainer 4 whereas the bent portions 23,24 are kept out of contact with the outer circumferential surface of the inner ring 5 and the inner circumferential surface of the inner retainer 4. Designated at numeral 27 are clips to be fitted in the inner retainer 4.

Figure 2:
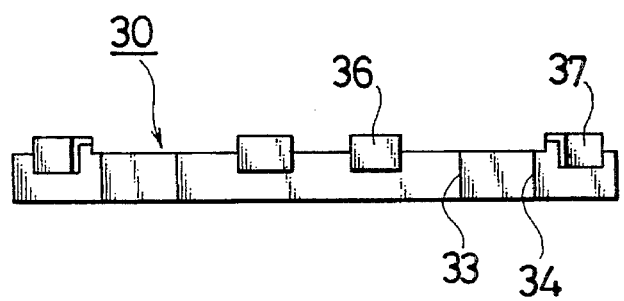
FIG. 2 is a plan view of a drag strip according to a first embodiment of the present invention.
Figure 3:
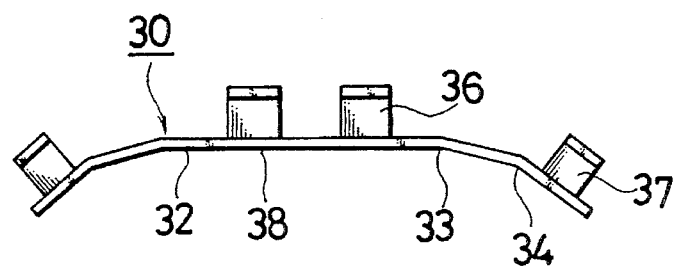
FIG. 3 is a side view of the drag strip of FIG. 2.

The drag strip according to the first embodiment of the present invention will now be described with reference to. FIGS. 2 and 3. There are shown the drag strip 30, a strip portion 32, a sliding area 38 to be brought into contact with the inner ring, bent portions 33,34, hangers 36 for holding the inner retainer, and clips 37 to be fitted in the inner retainer.

Figure 4:
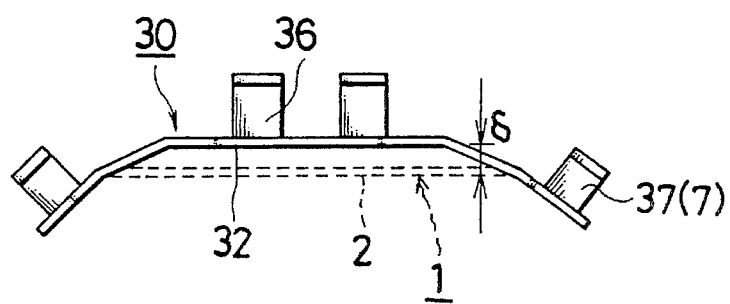
FIG. 4 illustrates a difference in the amount of flexion between a conventional drag strip and the drag strip according to the first embodiment of the present invention.

The amount of a flexion of the conventional drag strip 1 shown in FIG. 4 and that of the drag strip 30 according to the first embodiment of this invention are compared in FIG. 4. The solid lines 32 indicate the strip portion of the drag strip 30 whereas the dashed lines 2 designate the strip portion of the conventional drag strip having no bent portion which when the drag strip 1 is assembled in the one-way clutch, is maintained out of contact with the outer circumferential surface of the inner ring 5 and the inner circumferential surface of the inner retainer 4. The drawing clearly indicates that owing to the provision of the bent portions 33, the amount of flexion has been reduced by δ. By adjusting the magnitude of δ, an appropriate racing drag can be obtained, thereby making it possible to reduce the bending stress and the friction and also to improve the durability.

Figure 5:
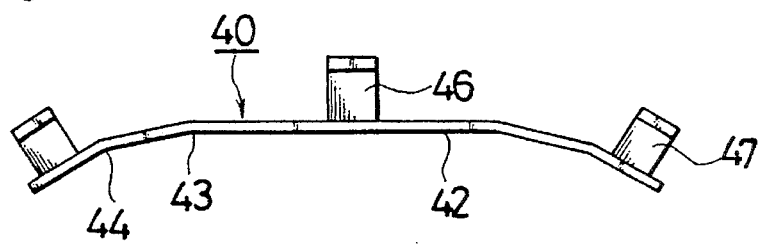
FIG. 5 is a side view of a drag strip according to a second embodiment of the present invention.
Figure 6:
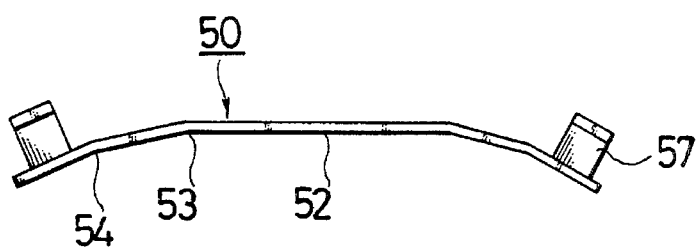
FIG. 6 is a side view of a drag strip according to a third embodiment of the present invention.
Figure 7:
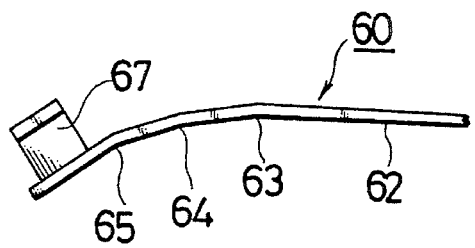
FIG. 7 is a fragmentary side view of a drag strip according to a fourth embodiment of the present invention, in which a strip portion is provided with two bent portions on each side of an area of contact between the drag strip and an associated inner ring of a one-way clutch, said bent portions being maintained out of contact with the inner ring and its adjacent inner retainer when said drag strip is assembled in the one-way clutch.
Figure 8:
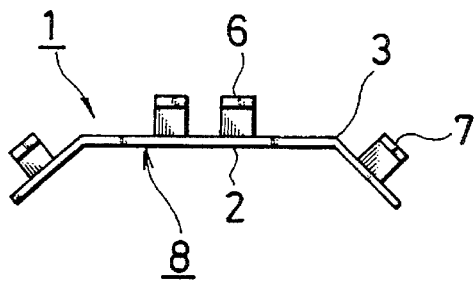
FIG. 8 is a side view of the conventional drag strip shown by dashed lines in FIG. 4.
Figure 9:
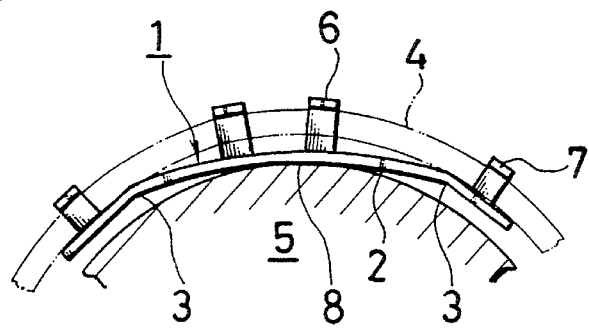
FIG. 9 illustrates a relationship between the drag strip of FIG. 8 and an associated inner retainer and inner ring.
Figure 10:
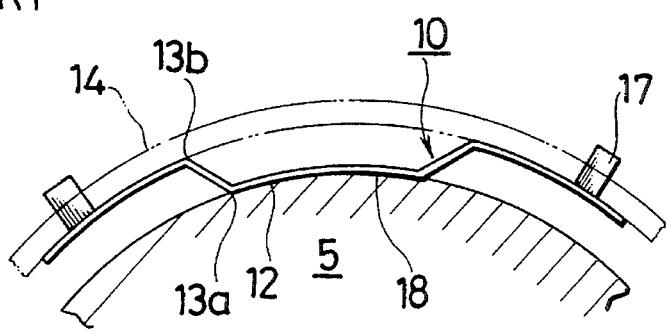
FIG. 10 depicts a relationship between another conventional drag strip and an associated inner retainer and inner ring.

FIG. 5 shows the drag strip according to the second embodiment of the present invention, The drag strip designated at numeral 40 is provided with two clips 47 at opposite end portions thereof, respectively, and a hanger 46 at a central portion thereof. The drag strip according to the third embodiment of the present invention is designated at numeral 50 in FIG. 6. The drag strip 50 is provided with two clips 57 at opposite end portions thereof, respectively, but is not provided with any hanger. FIG. 7 depicts at numeral 60 the drag strip according to the fourth embodiment of the present invention. As indicated at numerals 63, 64, 65, the drag strip 60 is bent at three positions on each side of an area of contact between the drag strip 60 and an associated inner ring. Of these bent portions 63, 64, 65, the bent portion 65 is maintained in contact with the inner circumferential surface of an inner retainer whereas the bent portions 63, 64 are kept out of contact with the outer circumferential surface of the inner ring and the inner circumferential surface of the inner retainer.

In each of the embodiments described above, each bent portion forms an angle smaller than 180° on a side of the associated inner ring. The present invention is however not limited to such an angle. Further, the drag strip according to each of the above-described embodiments has a symmetrical configuration with respective to a longitudinal midpoint thereof. Here again, the present invention is not limited to such a configuration.

As in each of the above-described embodiments, the bent end portions may desirably be formed so that when the drag strip is assembled in a one-way clutch, the bent end portions lie on an inner circumferential surface of an inner retainer of the one-way clutch.

Owing to the above-described construction of each drag strip according to the present invention suitable for use in the one-way clutch, the drag strip can bring about numerous advantages including the following ones:

(1) An appropriate racing drag can be obtained by choosing the dimensions of its bent portions which when assembled in a one-way clutch, are maintained out of contact with its adjacent members of the one-way clutch.

(2) Compared with the spring forces of conventional drag strips, the drag strip according to the present invention has a smaller spring force and hence a lower bending stress. The drag strip according to the present invention is therefore more advantageous in deformation, damage, breakage and the like than the conventional drag strips.

(3) The contact pressure against an associated inner ring has been reduced so that the sliding area of the drag strip according to the present invention has a prolonged abrasion life.

(4) A smaller reaction force is applied to each bent portion so that the bent portion (fulcrum) is worn less. Further, the frictional force which occurs between the bent portion (fulcrum) and an associated inner retainer has been reduced, thereby allowing each clip portion of the drag strip to smoothly slide without being caught.

(5) Compared with the conventional drag strips, the drag strip according to this invention can be formed longer, thereby making it possible to set the spring constant at a smaller value. This leads to a smaller change in the bending stress relative to a change in the amount of flexion, resulting in an improved fatigue life.

Figure 11:
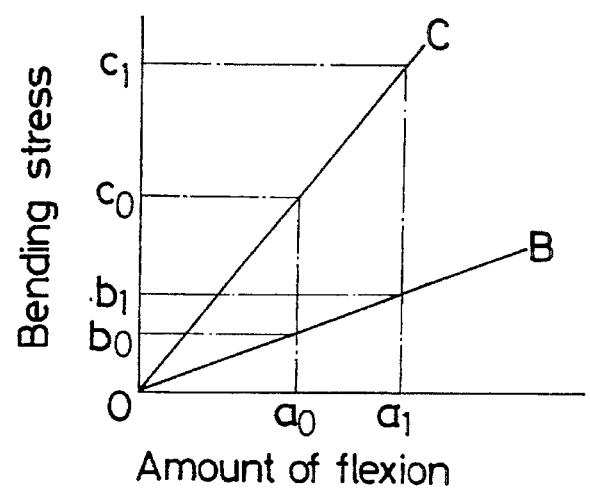
FIG. 11 diagrammatically shows a relationship between the amount of flexion and bending stress.

Reference is now had to the diagram shown in FIG. 11. Amounts of flexion are plotted along the axis of abscissa while bending stresses are plotted along the axis or ordinates. Line B represents a drag strip according to the present invention whereas line C designates a conventional drag strip whose strip portion has the same length as the drag strip of the present invention. The following inequality can be derived from the diagram:

$$(b_1-b_0)<(c_1-c_0)$$

where $b_0$: the bending stress of the drag strip according to present invention for an amount of flexion, $a_0$, $c_0$: the bending stress of the conventional drag strip for the amount of flexion, $a_0$, $b_1$: the bending stress of the drag strip according to present invention for another amount of flexion, $a_1$, and $c_1$: the bending stress of the conventional drag strip for the amount of flexion, $a_1$, As mentioned above under (5), each drag strip according to the present invention results in a smaller change in the bending stress for the same change in the amount of flexion compared with conventional drag strips and is hence advantageous against repeated loads.

What is claimed is:

1. In a multi-bent drag strip suitable for use in a one-way clutch having an outer and inner rings, a ring-shaped outer and inner retainers arranged between inner and outer circumferential surfaces of said outer and inner rings, and plural sprags held in place by said outer and inner retainers to permit selective transmission of a torque between said outer and inner rings, said drag strip having a strip portion to be disposed in contact at a part thereof with one of said inner circumferential surface of said outer ring and said outer circumferential surface of said inner ring and bent end portions located on opposite sides of said strip portion and to be disposed in contact with an outer circumferential surface of said outer retainer when said strip portion is disposed in contact at the part thereof with said inner circumferential surface of said outer ring or with an inner circumferential surface of said inner retainer when said strip portion is disposed in contact at the part thereof with said outer circumferential surface of said inner ring, the improvement wherein between an area of contact between said strip portion and said inner circumferential surface of said outer ring or said outer circumferential surface of said inner ring and each of said bent end portions, said strip portion has at least one bent portion to be disposed out of contact with said inner circumferential surface of said outer ring and said outer circumferential surface of said outer retainer or with said outer circumferential surface of said inner ring and said inner circumferential surface of said inner retainer.

2. A multi-bent drag strip according to claim 1, wherein between said area of contact between said strip portion and said inner circumferential surface of said outer ring or said outer circumferential surface of said inner ring and each of said bent end portions, said strip portion has two bent portions to be disposed out of contact with said inner circumferential surface of said outer ring and said outer circumferential surface of said outer retainer or with said outer circumferential surface of said inner ring and said inner circumferential surface of said inner retainer.

3. In a multi-bent drag strip suitable for use in a one-way clutch having an outer and inner rings, a ring-shaped outer and inner retainers arranged between inner and outer circumferential surfaces of said outer and inner rings, and plural sprags held in place by said outer and inner retainers to permit selective transmission of a torque between said outer and inner rings, said drag strip having a strip portion to be disposed in contact at a part thereof with said outer circumferential surface of said inner ring and bent end portions located on opposite sides of said strip portion and to be disposed in contact with an inner circumferential surface of said inner retainer, the improvement wherein between an area of contact between said strip portion and said outer circumferential surface of said inner ring and each of said bent end portions, said strip portion has at least one bent portion to be disposed out of contact with said outer circumferential surface of said inner ring and said inner circumferential surface of said inner retainer.

4. A multi-bent drag strip according to claim 3, wherein said at least one bent portion defines an angle smaller than 180° on a side of said inner ring.

5. A multi-bent drag strip according to claim 3, wherein between said area of contact between said strip portion and said outer circumferential surface of said inner ring and each of said bent end portions, said strip portion has two bent portions to be disposed out of contact with said outer circumferential surface of said inner ring and said inner circumferential surface of said inner retainer.

6. A multi-bent drag strip according to claim 5, wherein each of said two bent portions of said strip portion defines an angle smaller than 180° on a side of said inner ring.

7. A multi-bent drag strip according to claim 3, wherein said drag strip has a symmetrical configuration with respective to a longitudinal midpoint thereof.

8. A multi-bent drag strip according to claim 3, wherein when assembled in said one-way clutch, said bent end portions lie on said inner circumferential surface of said inner retainer.

9. A multi-bent drag strip according to claim 3, further comprising two clips formed on said bent end portions, respectively, so that when assembled in said one-way clutch, said drag strip can be supported on said inner retainer by means of said two clips.

10. A multi-bent drag strip according to claim 9, further comprising at least one hanger formed on said strip portion so that when assembled in said one-way clutch, said drag strip can be additionally supported on said inner retainer by means of said hanger.

* * * * *